United States Patent [19]

Rodriquez, Jr. et al.

[11] Patent Number: 5,428,416
[45] Date of Patent: Jun. 27, 1995

[54] OVERHEAD PROJECTOR SUPPORT LEG MECHANISM

[75] Inventors: Ernesto M. Rodriquez, Jr., Round Rock; James E. Peterson, Austin, both of Tex.

[73] Assignee: Minnesota Mining and Manufacturing Company

[21] Appl. No.: 242,175

[22] Filed: May 13, 1994

[51] Int. Cl.⁶ ............................................. G03B 21/00
[52] U.S. Cl. ................... 353/119; 353/DIG. 3
[58] Field of Search .......... 353/119, DIG. 3, DIG. 4, 353/63, 64, 65, 66

[56] References Cited

U.S. PATENT DOCUMENTS

| | | | |
|---|---|---|---|
| 3,870,411 | 3/1975 | Schwartz et al. | 353/119 |
| 4,449,800 | 5/1984 | DeLongia et al. | 353/119 |
| 4,968,134 | 11/1990 | Shimizu et al. | 353/DIG. 3 |
| 4,969,733 | 11/1990 | Jewison | 353/119 |

FOREIGN PATENT DOCUMENTS 1168485  6/1984  Canada .
3519506 12/1986  Germany .

Primary Examiner—William A. Cuchlinski, Jr.
Assistant Examiner—William C. Dowling
Attorney, Agent, or Firm—Gary L. Griswold; Walter N. Kirn; David W. Anderson

[57] ABSTRACT

An overhead projector includes an opening in its bottom to accommodate a pivoting mirror. This opening is closed by two doors which pivot to support the projector in use. The projector includes latches which retain the doors in the closed position and gravity cams which retain the doors in the open position, but which automatically release the doors when the projector is placed on its side.

1 Claim, 3 Drawing Sheets

OVERHEAD PROJECTOR SUPPORT LEG MECHANISM

FIELD OF THE INVENTION

The present invention relates to transmissive type overhead projectors.

BACKGROUND OF THE INVENTION

Overhead projectors for projecting an image of indicia on a transparent film (a transparency) in general include a light source, a stage upon which the transparency is positioned, a projection lens supported above the stage, and a mirror associated with the projection lens. Light from the source is directed through the transparency, to the projection lens and is reflected by the mirror to a vertical surface for viewing by an audience.

Some types of overhead projectors are termed transmissive type projectors since the light source is included in a base enclosure and the light is directed from the base through the transparency and to the projection lens. To make the base as small as possible for transportation, there is typically included a planar mirror in the base to fold the path of the light from the source. To further decrease the size of the base, this base mirror may be pivoted so that the mirror may be rotated into the base. For use, the base is supported by legs and the mirror pivoted through an opening in the base to its operational position.

SUMMARY OF THE INVENTION

The present invention provides a mechanism for easily converting a transmissive overhead projector between its operational and storage conditions, the overhead projector comprising a base including a frame having a bottom including an opening and sides disposed a substantially right angles to the bottom, support means pivoted to the frame, the support means being rotatable between an operational position and a storage position for closing the opening in the storage position and supporting the base in the operational position, biasing means for urging the support means toward the operational position, latches for releasably retaining the support means in the storage position, and means for releasably retaining the support means in the operational position. In the preferred version of the invention, the support means are two doors and the means for retaining the support means in the operational position are two gravity cams each including a body pivotally mounted on the frame, a cam extending from the body to engage one of the doors and a weight attached to the body such that gravity acting on the weight forces the cam into contact with the door when the frame is positioned for operation and gravity acting on the weight retracts the cam from the door when the base is tipped so that the base is supported by one of its sides.

BRIEF DESCRIPTION OF THE DRAWINGS

The present invention will be more thoroughly described with respect to the accompanying drawings, wherein like numbers refer to like parts in the several views, and wherein.

DESCRIPTION OF THE PREFERRED EMBODIMENT

Figure 1:
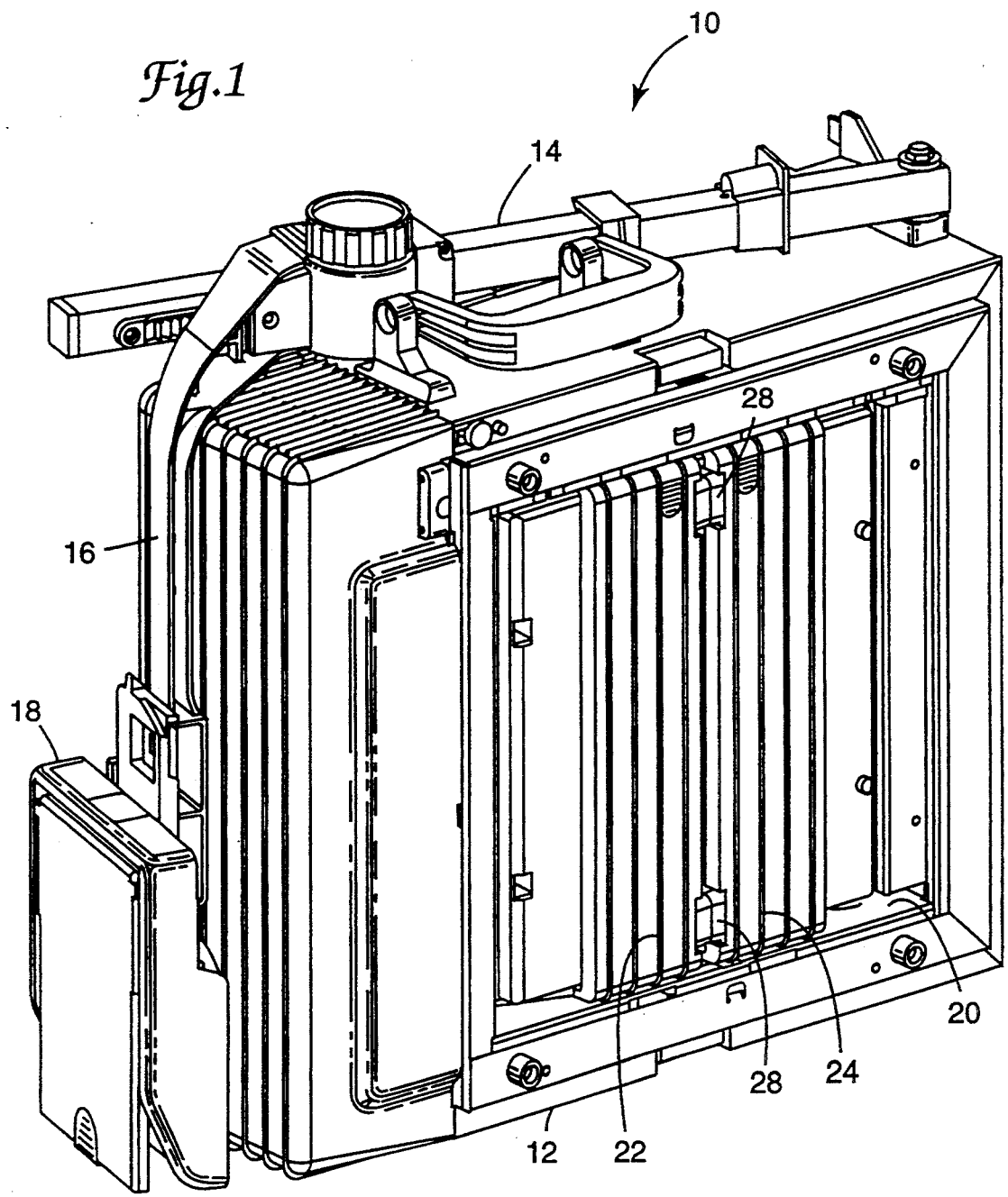
FIG. 1 is a perspective view of an overhead projector according to the present invention as it is configured for transport.

FIG. 1 illustrates an overhead projector generally indicated as 10 which includes a rectangular base 12, a support arm 14, a projection head focus arm 16 and a projection head 18. These components are conventional parts of typical overhead projectors. The overhead projector 10 is configured in FIG. 1 with the support arm 14 folded forward for transportation and standing on one side of its base 12 to reveal the bottom of the projector 10 and an opening 20 which is closed in FIG. 1 by two doors 22 and 24.

Figure 2:
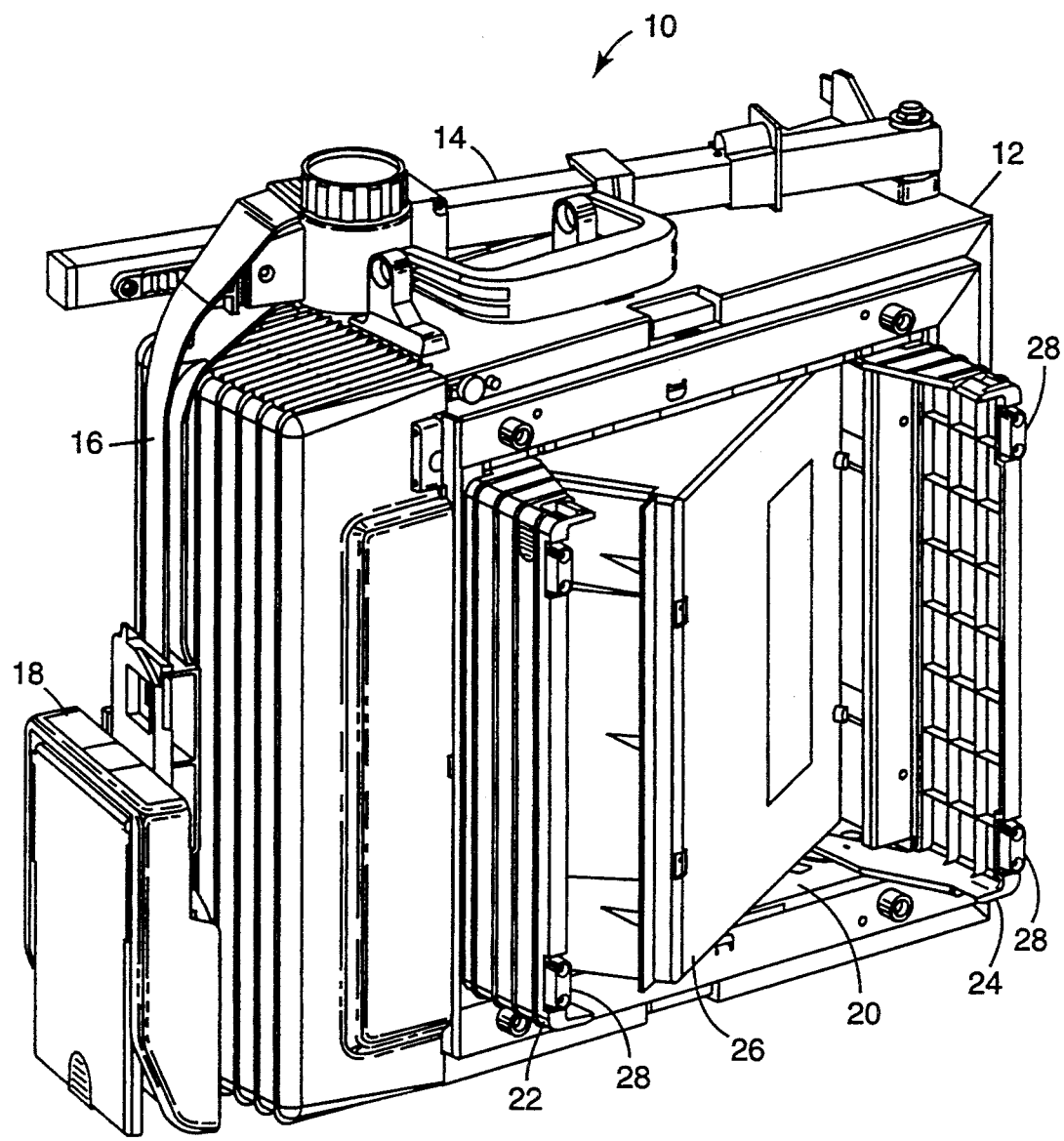
FIG. 2 is a perspective view of the overhead projector of FIG. 1 with portions deployed for operation.

FIG. 2 illustrates the doors 22 and 24 in the open position which permits a mirror 26 to pivot downwardly. The use of a pivoting mirror 26 allows the base 12 in the transport configuration to be slimmer than it would otherwise have to be for operation. The doors 22 and 24 lock in the open position and include feet 28 which support the base 12 a distance above a surface necessary to provide clearance for the mirror 26.

Figure 3:
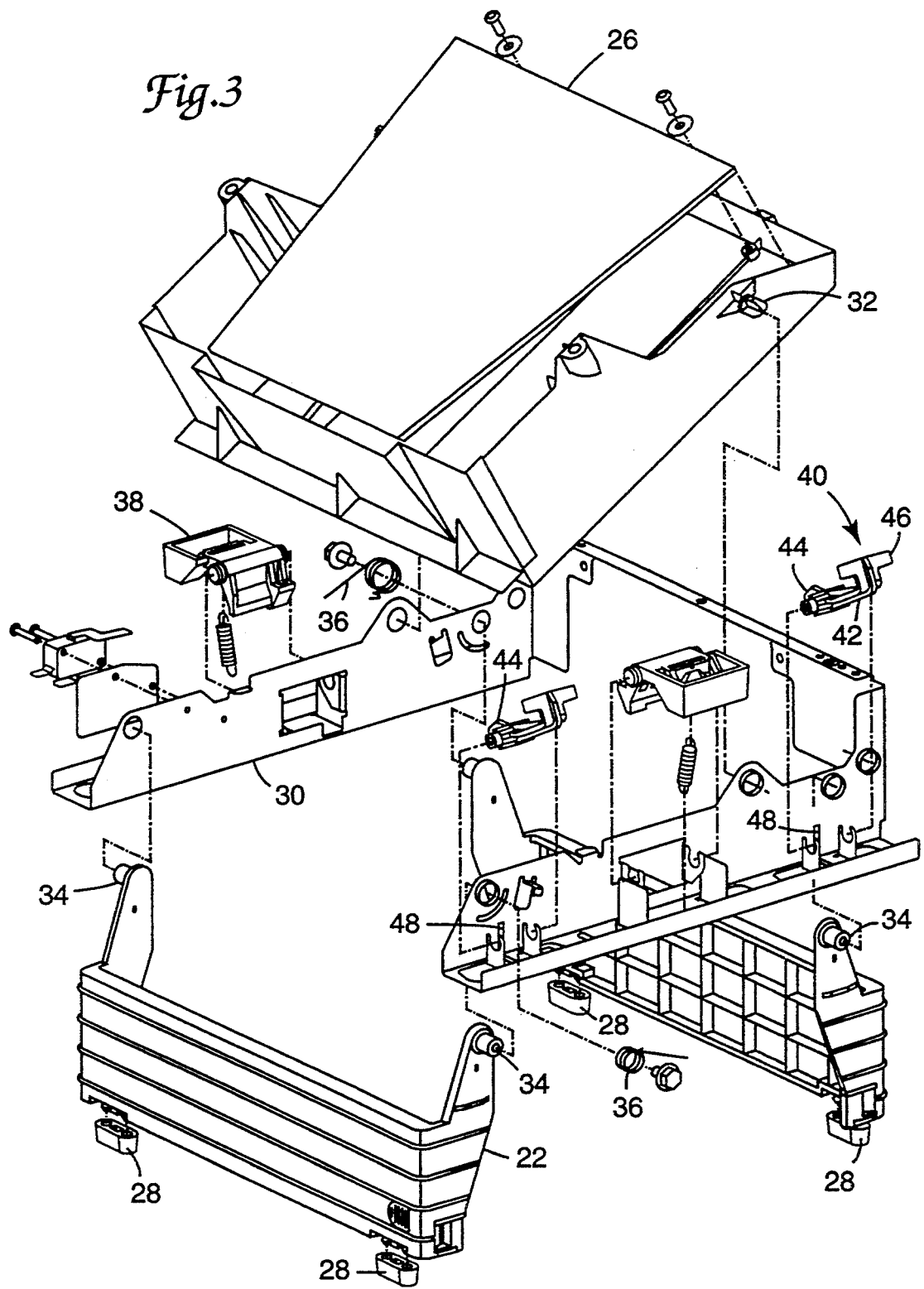
FIG. 3 is an exploded, perspective view of major portions of the projector of FIG. 1.

FIG. 3 illustrates a frame 30 which forms a part of the base 12. The mirror 26 is pivoted to the frame 30 by means of two bearings 32. The doors 22 and 24 likewise are pivotally mounted to the frame 30 by means of bearings 34. Each door 22 or 24 is biased toward the open position by a torsion spring 36, and, when manually closed, is retained in the closed position by two latches 38. As best seen in FIG. 2, the doors 22 and 24 are released by pressing the latches 38 upwardly.

Finally, the doors 22 and 24 are retained in the open position by two gravity cams 40. Each gravity cam 40 includes a body portion 42 which is rotatably mounted to the frame 30, a cam blade 44 and a weight 46 attached to the body portion 42 opposite the cam blade 44.

When the base 12 of the overhead projector 10 is oriented in the operational position as shown in FIG. 3, the weights 46 cause the cam blades 44 to enter slots 48 in the frame 30 and block the doors 22 and 24 from moving to the closed position. It will be seen that gravity cams 40 are provided on only one side of the frame 30, so that when the projector 10 is placed on its side as shown in FIGS. 1 and 2, the weights 46 cause the cam blades 44 to retract from the slots 48 and thus allow the doors 22 and 24 to be closed.

To deploy the overhead projector 10 from its transport configuration, the user need only lift the base 12 from the surface upon which the projector 10 is to be placed and lift the two latches 38 located at each side of the projector 10 base 12. Lifting the latches 38 releases the doors 22 and 24 and allows the torsion springs 36 to carry them open, with the assistance of gravity. At the same time the doors 22 and 24 are opening, the mirror 26 will pivot downwardly to its extended position. The user can then lower the projector 10 to the support surface and it is ready for use. Of course the support arm 14 must also be raised to properly position the projection head 18 above the projector 10 base 12. Since the projector 10 is oriented as in FIG. 3, the gravity cams 40 will pivot so that the cam blades 44 prevent the doors 22 and 24 from closing.

When it is desired to configure the projector 10 for transport, the support arm 14 is lowered to the position shown in FIG. 1 and 2 and the projector 10 is placed on its side as is shown in those figures. The projector 10 will then be in the position illustrated by FIG. 2. The user then may push the mirror 26 into the base 12, and, because the gravity cams 40 have retracted the cam blades 44, may push the doors 22 and 24 shut against the force of the torsion spring 36. The doors 22 and 24 will be retained in the closed position by the latches 38.

There has thus been described a portable overhead projector 10 which may be easily converted for use or transport. Although the present invention has been described with respect to only a single embodiment, many modifications will be apparent to those skilled in the art. For example, the doors need not be full panels as shown and the gravity cams and the latches 38 may assume a variety of forms so long as their function is accomplished. Generally speaking, the weight of the gravity cam is best disposed at approximately 45° to the horizontal when the base is horizontal so that gravity will cause the cam to operate when the projector is placed on its side, but other angles are possible. The torsion springs may be located on the same side of the base, and there could be four instead of two.

We claim:

1. A transmissive overhead projector comprising:

a base including a frame having a bottom including an opening and sides disposed at substantially right angles to said bottom;

two doors each pivoted to said frame, said doors each being rotatable between an operational position and a storage position for closing said opening in said storage position and supporting said base in said operational position;

biasing means for urging said doors toward said operational position;

latches for releasably retaining said doors in said storage position; and means for releasably retaining said doors in said operational position including two gravity cams each including a body pivotally mounted on said frame, a cam blade extending from said body to engage one of said doors and a weight attached to said body such that gravity acting on said weight forces said cam blade into contact with said door when said frame is positioned for operation and gravity acting on said weight retracts said cam blade from said door when said base is tipped so that said base is supported by one of its sides.

* * * * *